United States Patent [19]
Morita

[11] Patent Number: 5,799,050
[45] Date of Patent: Aug. 25, 1998

[54] SYNC DETECTION CIRCUIT AND METHOD USING VARIABLE REFERENCE FOR COMPARISON WITH MISMATCH COUNT

[75] Inventor: Kazuo Morita, Shizuoka, Japan

[73] Assignee: NEC Corporation, Tokyo, Japan

[21] Appl. No.: 842,204

[22] Filed: Apr. 23, 1997

[30]   Foreign Application Priority Data

Apr. 26, 1996 [JP] Japan .................... 8-106858

[51] Int. Cl.$^6$ ........................................... H04L 7/00
[52] U.S. Cl. ........................................ 375/368; 375/365
[58] Field of Search ............................... 375/368, 365, 375/366; 370/513, 514

[56]   References Cited

U.S. PATENT DOCUMENTS 3,525,813   8/1970   Taylor et al. .................... 375/368
4,554,540  11/1985   Mori et al. ....................... 375/368

FOREIGN PATENT DOCUMENTS 60-247344  12/1985   Japan .

*Primary Examiner*—Stephen Chin
*Assistant Examiner*—Frederick Yu
*Attorney, Agent, or Firm*—Scully, Scott, Murphy & Presser

[57]   ABSTRACT

In a sync detector, a baseband signal is segmented into a plurality of successive bit sequences so that the bits of each sequence are shifted by one bit position with respect to the bits of adjacent sequences. On a bit-by-bit basis, mismatches are detected between each input bit sequence and a predetermined bit sequence and the detected mismatches are counted to produce a mismatch count. A first comparison is made between the mismatch count and a reference value to determine that a sync code is detected if the mismatch count is equal to or smaller than the reference value, and a further comparison is made between successively produced mismatch counts to determine that a sync code is detected when the later of the successively produced mismatch counts is equal to or smaller than the earlier one. The first comparison is repeated when the later mismatch equals zero.

6 Claims, 2 Drawing Sheets

SYNC DETECTION CIRCUIT AND METHOD USING VARIABLE REFERENCE FOR COMPARISON WITH MISMATCH COUNT

BACKGROUND OF THE INVENTION

1. Field of the Invention

The present invention generally relates to the detection of synchronization, and specifically to the detection of a sync code transmitted at periodic intervals. The present invention is particularly suitable for radio paging receivers.

2. Description of the Related Art

The detection of a frame sync code from a recovered a baseband digital bit stream usually involves the bit-by-bit comparison of the bit stream with the bit pattern of the sync code to detect a match or mismatch therebetween. It is then recognized that a sync code is detected if there is a complete match and a decoding process begins. However, if the transmitted sync code is corrupted during transmission, the sync detection fails even if there is only one bit error in the received sync code. As a result, a burst error occurs in the decoded signal.

Japanese Laid-Open Patent Specification Sho-60-247344 discloses a sync detector for a PCM communication system. The prior art sync detector comprises first and second comparators, the first comparator producing an output when an input bit sequence matches completely with a predetermined sync bit pattern. The second comparator produces an output even when the input bit sequence does not completely match the sync bit pattern. The first and second comparator outputs are utilized when they occur within the period of a window pulse which is derived from the first comparator output.

However, since the second comparator produces an output when there is a predetermined number of mismatches, the probability of data (payload) bits coinciding with the sync bit pattern will increase, while the probability of a transmitted sync code coinciding with the sync bit pattern will decrease if the transmitted signal is severely corrupted by noise and multipath reflections. As a result, sync codes, if severely corrupted, are not likely to be detected as an authentic sync code for an extended period of time.

In addition, there is still a need to provide a sync detector which can be implemented with simple circuitry suitable for applications such as radio pagers.

SUMMARY OF THE INVENTION

It is therefore an object of the present invention to provide a simple and yet effective solution to the problem of frame sync detection under noisy channels. More specifically, the object of the present invention is to provide a noise-tolerant sync detector.

The present invention is based on the fact that under a varying error bit rate the average number of mismatches detected from possible sync fields varies significantly, while a large number of mismatches are consistently detected from possible data fields regardless of the bit error rate. When the bit error rate is decreasing, the sync-field mismatch count also decreases and the reliability of a threshold decision increases if the decision threshold is reduced corresponding to the decreasing mismatch count. The present invention is useful for noisy environment in which the bit error rate has a tendency to increase rapidly and then decreases gradually and repeats this process.

According to one aspect of the present invention, there is provided a sync detector comprising means for sequentially receiving an input bit sequence and successively detecting mismatches between the input bit sequence and a predetermined bit sequence on a bit-by-bit basis and a mismatch counter for successively producing count values each indicating a number of the detected mismatches. Logic circuitry is provided for making a first comparison between a reference value and an output of the counter, making a determination that a sync code is detected when the counter output is equal to or smaller than the reference value, making a second comparison between successively produced outputs of the counter, making a determination that a further sync code is detected when the later of the successively produced counter outputs is smaller than the earlier counter output, and repeating the first comparison when the later counter output becomes equal to zero.

Specifically, the logic circuitry comprises a memory connected to the mismatch counter in which is initially stored the reference value that is smaller than the maximum number of bits of the predetermined bit sequence. The output of the counter is compared with the content of the memory to produce an output indicating that a sync code is detected when the counter output becomes equal to or smaller than the memory content and the memory is updated with the counter output when the counter output is smaller than the memory content, and the memory is updated with the reference value when the counter output becomes equal to zero.

According to second aspect, the present invention provides a method for detecting a sync code, comprising the steps of:

a) successively detecting mismatches between each of a plurality of successive bit sequences and a predetermined bit sequence on a bit-by-bit basis, wherein the bits of each successive bit sequence being shift by one bit position with respect to the bits of adjacent bit sequences;

b) successively producing a count value indicating a number of the detected mismatches;

c) comparing the count value with a reference value and determining that a sync code is detected when the count value is equal to or smaller than the reference value; and d) making a comparison between count values successively produced by the step (b) and determining that a further sync code is detected when the later of the successively produced count values is equal to or smaller than the earlier count value, and returning to the step (c) when the later count value becomes equal to zero.

According to third aspect, the present invention provides a method for detecting a sync code, comprising the steps of:

a) successively detecting mismatches between each of a plurality of successive bit sequences and a predetermined bit sequence on a bit-by-bit basis, wherein the bits of each successive bit sequence being shift by one bit position with respect to the bits of adjacent bit sequences;

b) successively producing a count value indicating a number of the detected mismatches;

c) storing a reference value smaller than a maximum number of bits of the predetermined bit sequence into a memory;

d) comparing the count value with the content of the memory;

e) if the count value is greater than the memory content, returning to the step (d);

f) if the count value becomes equal to or smaller than the memory content, determining that a sync code is detected and if the count value is smaller than the memory content, updating the memory with the count value;

g) waiting a predetermined time;

h) determining whether the memory content is equal to zero;

i) returning to the step (d) if the memory content is not equal to zero and returning to the step (c) if the memory content is equal to zero.

BRIEF DESCRIPTION OF THE DRAWINGS

The present invention will be described in further detail with reference to the accompanying drawings, in which.

DETAILED DESCRIPTION

Figure 1:
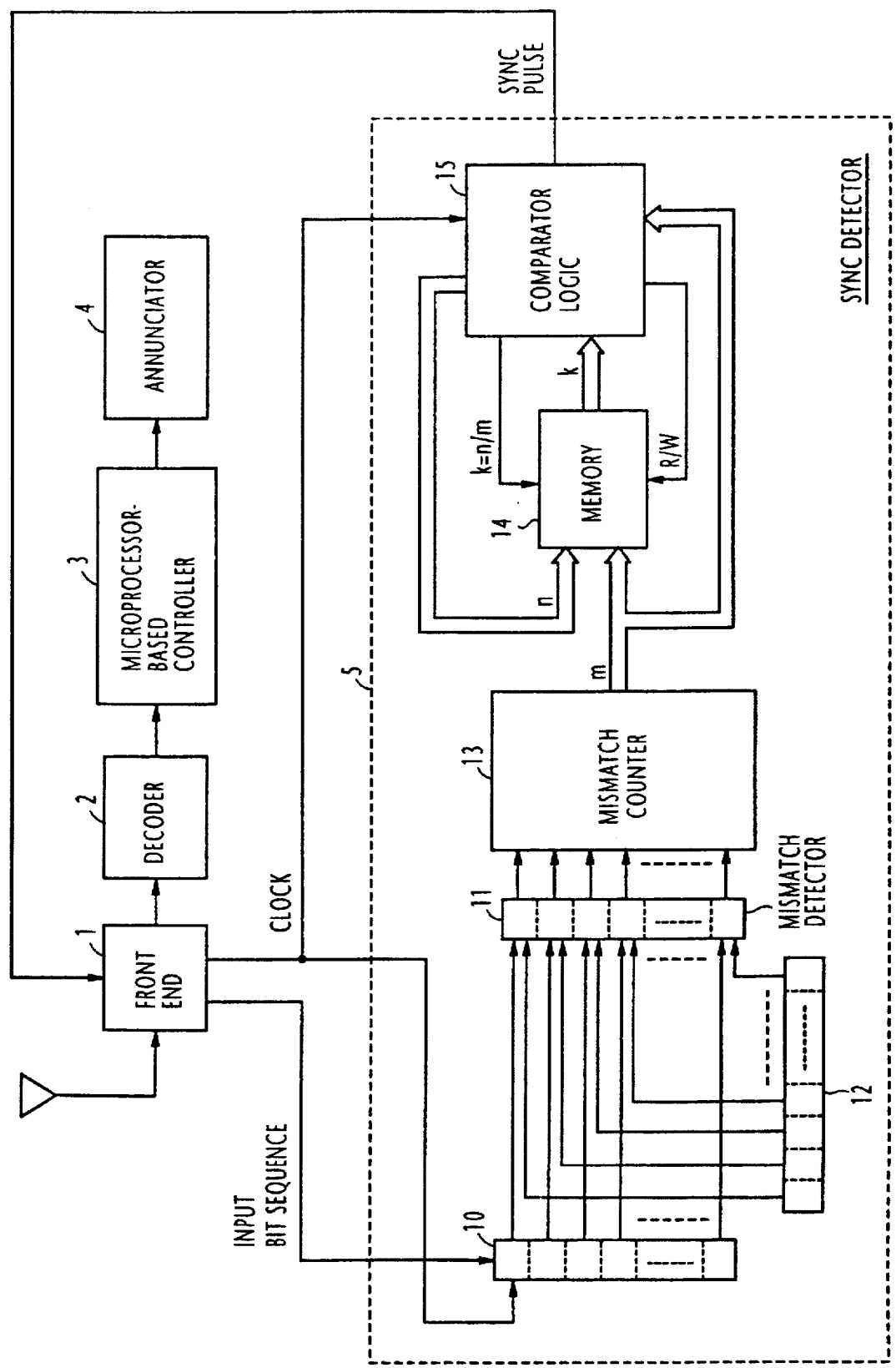
FIG. 1 is a block diagram of a selective calling radio pager incorporating a sync detector according to the present invention.

A selective calling radio pager incorporating a sync detector of the present invention is shown in FIG. 1. The pager includes a radio section, or front end 1, a decoder 2, a microprocessor-based controller 3 and an annunciator 4. Front end 1 receives a paging signal transmitted on a carrier which is modulated with a frame sync code and encoded data (payload) bits and recovers a baseband signal containing a bit sequence and bit-timing clock pulses. The encoded data bits are translated to the original bit sequence in the decoder 2 and fed to the controller 3. If an address code contained in the received paging signal matches the pager's address, the annunciator 4 is activated by the controller 3 to alert the user.

The sync detector 5 includes a shift register 10 which is clocked to receive the digital baseband signal from the front end 1 and segment it into a plurality of successive bit sequences of predetermined length (typically, 32 bits) so that the bits of each successive sequence stored in shift register 10 are shifted by one bit position with respect to the bits of adjacent sequences. The stored input bits are supplied from shift register 10 to a mismatch detector 11 where they are compared with a bit pattern of the frame sync code which is stored in a register 12 on a bit-by-bit basis. Mismatch detector 11 is comprised by a plurality of exclusive-OR gates corresponding in number to the number of bits in the frame sync code. The mismatch detector 11 produces logic-1 outputs corresponding in number to mismatches detected between the input bits and the stored synchronization bits. Mismatch counter 13 counts the number of logic-1 outputs from the mismatch detector 11 and produces, at bit intervals, a binary output signal "m" indicating the number of detected mismatches.

The output of counter 13 is coupled to a memory 14 and a comparator logic 15 which controls the memory 14 to store an initial reference mismatch count "n" or the output of counter 13. The number of mismatches stored in the memory 14 is represented by a variable "k" and supplied to the comparator logic 15 as a reference count value. The initial value "n" represents the number of bits in the frame sync code. By using the "m" and "k" values, the comparator logic 15 supplies a sync timing pulse to the front end 1 where it is used to recognize the start timing of each of the transmitted frames. Comparator logic 15 operates with the clock pulse from the front end 1 to provide a timing action.

Figure 2:
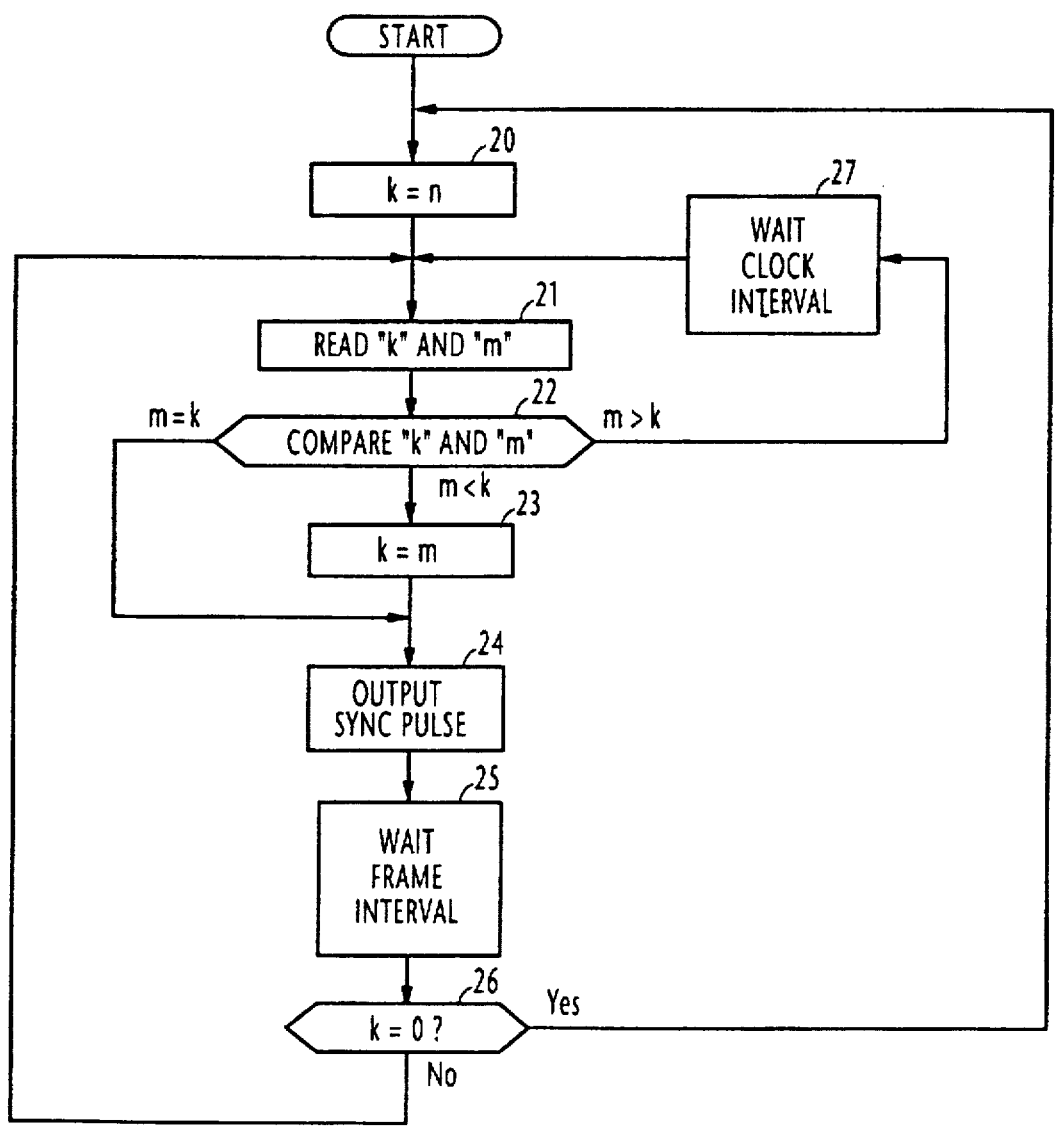
FIG. 2 is a flowchart of the operation of a comparator logic.

The operation of the comparator logic 15 will be described below with reference to the flowchart illustrated in FIG. 2.

The operation of comparator logic 15 begins with initialization step 20 in which the "k" value is set to the initial reference value "n" by writing the n-value into memory 14. In a practical aspect, the initial value "n" is equal to "3" for a frame sync code of 32-bit length. At step 21, comparator logic 15 reads the "m" value from mismatch counter 13 and the "k" value from memory 14 and compares them with each other (step 22). If m<k, flow proceeds from step 22 to step 23 to set the reference value "k" equal to "m" by updating the memory 14 with the current output of counter 13 and proceeds to step 24 to supply a sync timing pulse to the front end 1. Then, the sync detector waits a frame interval (step 25). At the end of the wait interval, flow proceeds to step 26 to determine if k=0. If not, flow returns to step 21 to repeat the process for the next frame.

If the decision at step 22 indicates that m=k, flow proceeds to step 24 to produce a sync timing pulse, skipping the updating step 23.

If m>k at step 22, flow proceeds to step 27 to wait a clock interval and returns to step 21 to repeat the bit-by-bit comparison process. Thus, during a data field, flow loops through steps 21, 22 and 27.

Therefore, if m≦k and k≠0, steps 21 to 26 are repeated and the reference value "k" in memory 14 will be successively decremented and eventually the k-value reaches zero. When this occurs, flow returns from step 26 to step 20 to restart the routine by resetting the stored k-value to the initial value "n".

Since the average value of mismatch counts detected from possible sync fields varies significantly with a varying bit error rate, while there is substantially no change in the average value of mismatch counts detected from data fields, there is a high likelihood of successive occurrences of a mismatch count "m" being equal to or smaller than the reference value "k" when the bit error rate is relatively high. Therefore, when the bit error rate decreases, the mismatch count of sync fields decreases. Thus, the updating of the reference value "k" with a smaller value of "m" at step 23 reduces the chances of a data bit sequence being erroneously detected as a sync code when the bit error rate is decreasing.

The sync detector of the present invention thus provides a simple and yet effective solution to the detection of a frame sync code under noisy channels such as selective calling radio pagers.

What is claimed is:

1. A sync detector comprising:

means for sequentially receiving a signal and segmenting the signal into a plurality of successive bit sequences so that the bits of each sequence are shifted by one bit position with respect to the bits of adjacent sequences and successfully detecting mismatches between each of the bit sequences and a predetermined bit sequence on a bit-by-bit basis;

a mismatch counter for successively producing count values each indicating a number of the detected mismatches; and logic means for making a first comparison between a reference value and an output of said mismatch counter, determining that a sync code is detected when the mismatch counter output is equal to or smaller than the reference value, making a second comparison between successively produced outputs of said mismatch counter, determining that a further sync code is detected when the later of the successively produced mismatch counter outputs is equal to or smaller than the earlier mismatch counter output, and repeating said first comparison when said later mismatch counter output becomes equal to zero;

said logic means first including:

a memory connected to the mismatch counter, said memory initially storing said reference value which is smaller than a maximum number of bits of said predetermined bit sequence; and comparator means for performing a comparison of the output of the mismatch counter with the content of the memory and for producing an output signal indicating that said sync code is detected when the mismatch counter output becomes equal to or smaller than the memory content, and updating said memory with the mismatch counter output when the mismatch counter outpout becomes smaller than the memory content and updating said memory with said reference value when the mismatch counter output becomes equal to zero;

wherein said comparator means performs said comparison after waiting for a predetermined interval when the mismatch counter output is greater than the memory content.

2. A selective calling radio pager comprising:

a front end for receiving a radio paging signal and recovering therefrom a digital signal containing a sync code and data bits;

means for sequentially receiving said digital signal and segmenting the signal into a plurality of successive bit sequences so that the bits of each sequence are shifted by one bit position with respect to the bits of adjacent sequences and successively detecting mismatches between each of the bit sequences and a predetermined bit sequence on a bit-by-bit basis;

a mismatch counter for successively producing count values each indicating a number of the detected mismatches; and logic means for making a first comparison between a reference value and an output of said mismatch counter, supplying a signal to the front end indicating that a sync code is detected when the mismatch counter output is equal to or smaller than the reference value, making a second comparison between successively produced outputs of said mismatch counter, supplying a signal to the front end indicating that a further sync code is detected when the later of the successively produced mismatch counter outputs is equal to or smaller than the earlier mismatch counter output, and repeating said first comparison when said later mismatch counter output becomes equal to zero;

said logic means including:

a memory connected to the mismatch counter, said memory initially storing said reference value which is smaller than a maximum number of bits of said predetermined bit sequence; and comparator means for performing a comparison of the output of the mismatch counter with the content of the memory and for supplying an output signal to said front end indicating that said sync code is detected when the mismatch counter output becomes equal to or smaller than the memory content, and updating said memory with the mismatch counter output when the mismatch counter output becomes smaller than the memory content and updating said memory with said reference value when the mismatch counter output becomes equal to zero;

wherein said comparator means performs said comparison after waiting for a predetermined interval when the mismatch counter output is greater than the memory content.

3. A method for detecting a sync code, comprising the steps of:

a) successively detecting mismatches between each of a plurality of successive bit sequences and a predetermined bit sequence on a bit-by-bit basis, wherein the bits of each successive bit sequence is shifted by one bit position with respect to the bits of adjacent bit sequences;

b) successively producing a count value indicating a number of the detected mismatches;

c) comparing the count value with a reference value;

d) when the count value is greater than the reference value, waiting for a predetermined time, updating the count value and returning to step (c);

e) determining that a sync code is detected when the count value is equal to or smaller than the reference value; and f) making a comparison between count values successively produced by the step (b) and determining that a further sync code is detected when the later of the successively produced count values is equal to or smaller than the earlier count value, and returning to the step (c) when said later count value becomes equal to zero.

4. A method as claimed in claim 3, wherein the step (a) comprises the steps of receiving a digital baseband signal recovered from a radio paging signal and segmenting the baseband signal into said plurality of successive bit sequences.

5. A method for detecting a sync code, comprising the steps of:

a) successively detecting mismatches between each of a plurality of successive bit sequences and a predetermined bit sequence on a bit-by-bit basis, wherein the bits of each successive bit sequence is shifted by one bit position with respect to the bits of adjacent bit sequences;

b) successively producing a count value indicating a number of the detected mismatches;

c) storing a reference value smaller than a maximum number of bits of the predetermined bit sequence into a memory;

d) comparing the count value with the content of the memory;

e) if the count value is greater than the memory content, waiting for a pre-specified time, updating the count value and returning to the step (d);

f) if the count value becomes equal to or smaller than the memory content, determining that a sync code is detected and if the count value is smaller than the memory content, updating the memory with the count value;

g) waiting a predetermined time;

h) determining whether the memory content is equal to zero;

i) returning to the step (d) if the memory content is not equal to zero and returning to the step (c) if the memory content is equal to zero.

6. A method as claimed in claim 5, wherein the step (a) comprises the steps of receiving a digital baseband signal recovered from a radio paging signal and segmenting the baseband signal into said plurality of successive bit sequences.

* * * * *

UNITED STATES PATENT AND TRADEMARK OFFICE
CERTIFICATE OF CORRECTION

PATENT NO. : 5,799,050
DATED : August 25, 1998
INVENTOR(S) : Kazuo Morita

It is certified that error appears in the above-identified patent and that said Letters Patent are hereby corrected as shown below:

Column 4, line 14: "dock" should read --clock--

Column 5, line 8, Claim 1: "outpout" should read --output--

Signed and Sealed this

Third Day of April, 2001

Attest:

NICHOLAS P. GODICI

*Attesting Officer*      *Acting Director of the United States Patent and Trademark Office*